2 Sheets—Sheet 1.
J. H. STRIEDINGER, J. R. F. KELLY & K. KORROW.
Apparatus for Subaqueous Drilling, Laying Foundations, &c.
No. 201,569. Patented March 19, 1878.
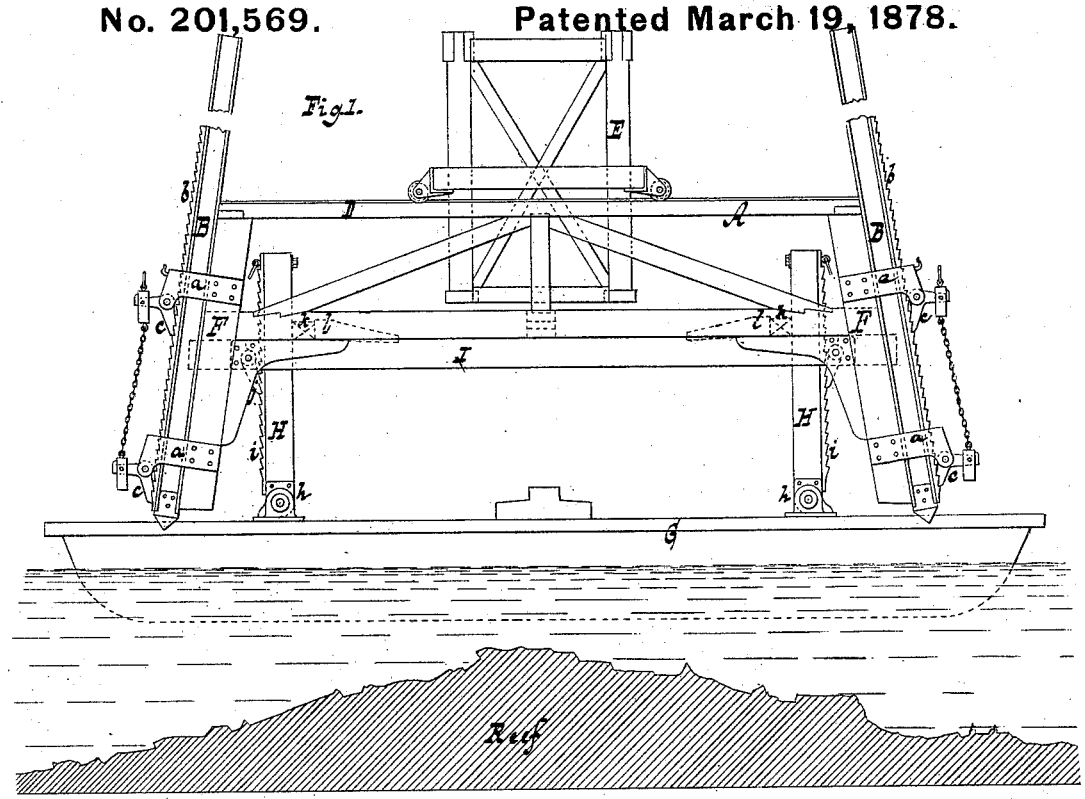
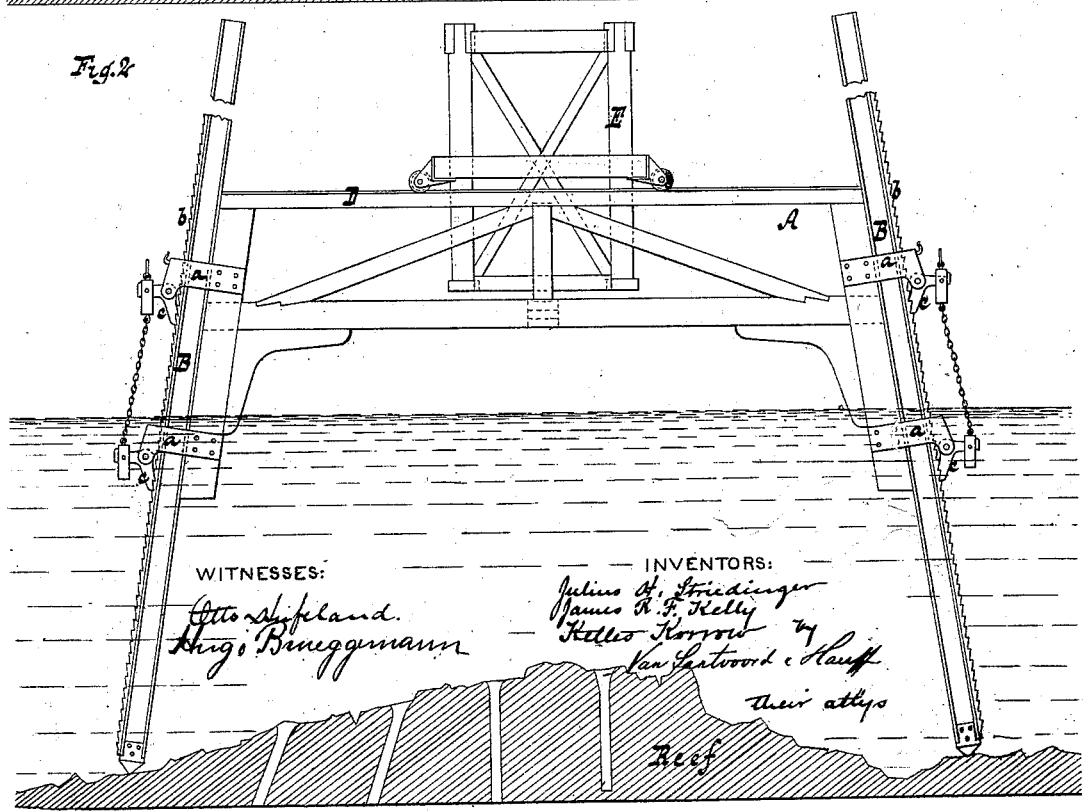

2 Sheets—Sheet 2.
J. H. STRIEDINGER, J. R. F. KELLY & K. KORROW.
Apparatus for Subaqueous Drilling, Laying Foundations, &c.
No. 201,569. Patented March 19, 1878.
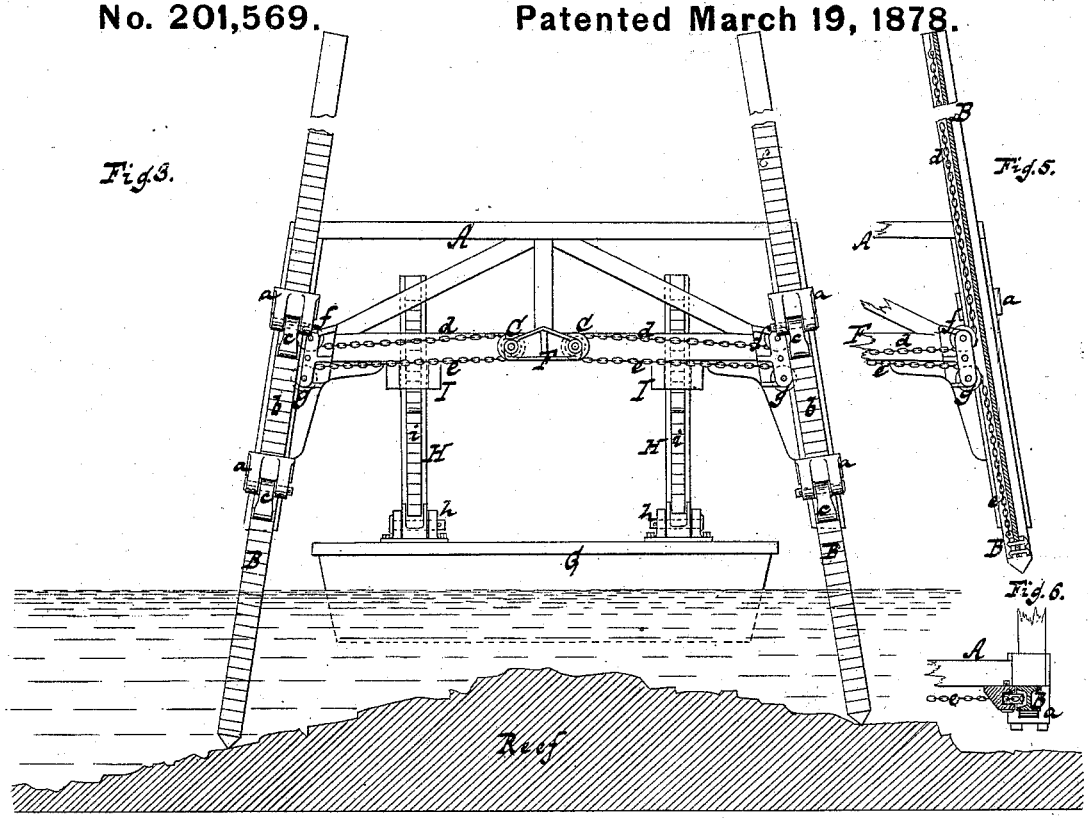
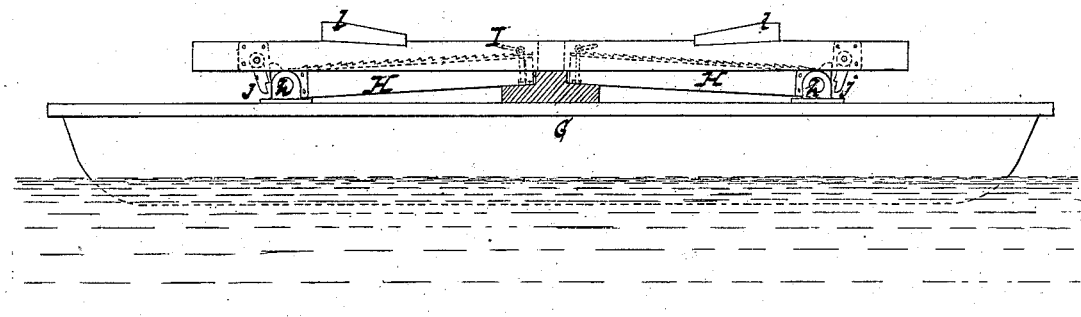
WITNESSES:
Otto Hufeland.
Hugo Brueggemann
INVENTORS:
Julius H. Striedinger
James R. F. Kelly
Kelles Korrow by
Van Santvoord & Hauff
their attorneys
N. PETERS, PHOTO-LITHOGRAPHER, WASHINGTON, D. C.

UNITED STATES PATENT OFFICE.

JULIUS H. STRIEDINGER, OF NEW YORK, JAMES R. F. KELLY, OF BROOKLYN, AND KELLES KORROW, OF GREEN POINT, N. Y.

IMPROVEMENT IN APPARATUS FOR SUBAQUEOUS DRILLING, LAYING FOUNDATIONS, &c.

Specification forming part of Letters Patent No. 201,569, dated March 19, 1878; application filed February 20, 1878.

*To all whom it may concern:*

Be it known that we, JULIUS H. STRIEDINGER, of the city, county, and State of New York, JAMES R. F. KELLY, of Brooklyn, in the county of Kings and State of New York, and KELLES KORROW, of Green Point, in the county of Kings and State of New York, have invented a new and Improved Apparatus for Subaqueous Operations, which invention is fully set forth in the following specification, reference being had to the accompanying drawings, in which—

Figure 1 represents a side view of our apparatus while in transit to the place of operation. Fig. 2 is a similar view of our apparatus when in position for work, the transporting-scow having been removed. Fig. 3 is an end view of the same before the transporting-scow has been removed. Fig. 4 is a detached view of the transporting-scow with its supporting-timbers lowered upon the deck. Fig. 5 is a sectional side view of one of the legs or struts and its guides, and Fig. 6 is a transverse section of the same.

Similar letters indicate corresponding parts.

The object of this invention is to produce a frame-work for the support of mechanism used in subaqueous operations, such as drilling, laying foundations, &c., said frame-work being so constructed that it can be easily floated to the desired spot, and put up in position for work, and then again floated off and put in another spot, and that the same, when put up, forms a steady support for the drilling-machine or other mechanism, which is not disturbed by waves and the tide.

Usually drilling-machines or other mechanisms used in subaqueous operations are firmly secured to a scow or float, of any suitable construction, which, when brought to the desired spot, has to be secured in position by anchors, and which remains subject to the influence of waves and tide.

It has also been proposed to combine with the float or platform supporting the drilling-machine or other mechanism a series of vertical legs, which, when the float has reached the desired spot, are depressed, so as to lift said float, together with the machinery supported by it, clear out of the water—an operation which cannot be accomplished except by the aid of powerful machinery, and by the exertion of great force, requiring a considerable number of men; and when the apparatus has been lifted out of the water its entire weight must be sustained by some mechanism, since it has a tendency to slide down on the vertical legs.

Our invention consists in the combination, with a frame or staging provided with adjustable legs or struts, and intended to support the mechanism to be employed in a subaqueous operation, of an independent scow or float, so that when said scow is brought under traverses of the staging the scow or float, together with the staging, can be conveniently floated to the desired spot, and that by lowering the struts on the bottom the staging is supported independent of the scow, and the scow can be floated off and used for placing in position or for taking up a number of different stagings with comparatively little help or loss of time. The scow is provided with standards, and with timbers adapted to slide up and down on said standards, so as to adapt them to the staging to be supported. The standards of the scow are hinged at their bottom ends, so that when the supporting-timbers are lowered said standards can be folded down and made to clear the traverses of the staging. Said standards are also provided with ratchet-teeth on their faces, to engage with stop-pawls secured to the supporting-timbers, and these timbers are provided with keys, so that by the co-operation of the stop-pawls, the ratchet-teeth, and the keys, the supporting-timbers can be readily adjusted to and locked at the desired elevation, and by withdrawing the keys the supporting-timbers are released and free to descend. The struts or legs are fitted to the staging in flaring positions, so that when the same are lowered on the bottom the staging will have a firm position, adapted to resist the motion of the water and the winds, and will be prevented from moving up or down on the struts. The struts are raised or lowered by chains or ropes extending from the opposite ends of each strut over guide-pulleys to a windlass, and they are provided with ratchet-teeth and stop-pawls, to retain them in position after they have been depressed.

In the drawings, the letter A designates a frame or staging, which is intended for the support of drilling machinery or other apparatus to be used in subaqueous operations. This frame is provided with four legs, B, which move up and down in guides $a$, secured to the sides of the frame, said guides being so arranged that the legs are thrown in inclined or flaring positions, as shown in Figs. 1, 2, and 3 of the drawings. The object of this arrangement is, that when the legs are lowered to the bottom, as shown in Figs. 2 and 3, they retain the frame firmly in position against winds and against the motion of the water, and also prevent the frame from sliding down on its legs, which object cannot be accomplished if the legs are placed in a vertical position or parallel to each other.

On our flaring legs the frame is sustained by its own weight; but in order to prevent either of the legs from being moved up accidentally, we have provided each leg with ratchet-teeth $b$, and to the guides $a$ are hinged gravitating-pawls $c$, which engage with said ratchet-teeth.

On two opposite sides of our frame we have secured windlasses C C, two on each side, Fig. 3, and from each windlass extend two ropes or chains, $d$ $e$, over guide-pulleys $f$ $g$, to the opposite ends of one of the legs B, (see Fig. 5,) said ropes or chains being fastened to the windlass, so that by turning said windlass in one direction the leg is raised, (the stop-pawls being thrown out of gear with the ratchet-teeth of the leg,) and by turning the windlass in the opposite direction the leg is lowered. Instead of using two separate ropes or chains on each windlass, a single rope or chain may be used, which is wound one or more times round the drum of the windlass, while its ends extend and are secured to the opposite ends of the corresponding leg.

The frame A is provided with rails D, for the support of a carriage, E, which contains the drilling-machinery or other mechanism; and below these rails are traverses F, (see Fig. 3,) for giving firmness to the frame and for supporting said frame on a float or scow, as will be presently more fully explained.

The float or scow G, which we use for bringing our frame to the required spot and for taking it up again, is shown in Figs. 1, 3, and 4. It may be made of any suitable form; but its width must be less than the length of the traverses F, so that it can be floated beneath the frame, as shown in Fig. 3, and its length must exceed the distance between the traverses, (see Fig. 1,) so that when the scow is floated beneath the frame and the legs B are raised, the traverses F come to bear upon the deck of the scow, or upon any parts secured to said deck.

If our frame is thus supported by the scow, it can be readily floated to any desired spot, and by lowering its legs the traverses F are caused to clear the deck, and after the frame has been adjusted in its working position the scow can be floated off from under it, leaving the same sufficiently elevated to prevent the motion of the water from disturbing its position.

In order to render the scow G serviceable in water which rises and falls with the tide, we provide the same with standards H, which rise from its deck, and which form the guides for timbers I, so that these timbers can be adjusted to the desired height above the deck of the scow. In order to enable us to float the scow with its standards beneath our frame, said standards are secured to the deck of the scow by hinge-joints $h$, so that they can be folded down to the position shown in Fig. 4; or they may be fitted into sockets in the deck of the scow, so that they can be moved up or down, as may be desired.

On the faces of the standards are formed ratchet-teeth $i$, and on the timbers I are secured pawls $j$, which engage with said ratchet-teeth, being retained in position by keys $k$, which are driven between the standards and shoulders $l$, formed on the timbers I, as shown in Fig. 1. Any other equivalent may, however, be employed for securing the timbers I on the standards H at the desired elevation above the deck of the scow.

After the scow has been floated beneath the frame, as shown in Fig. 3, the standards H are raised, and the timbers I are adjusted close beneath the traverses F. Then the legs of the frame are moved up to the position shown in Fig. 1, and the entire apparatus can be floated to any spot where it may be required.

If the tide happen to be low, as shown in Fig. 3, the standards and supporting-timbers are indispensable; but if the tide is high, as indicated in Fig. 2, the frame may be lowered directly upon the deck of the scow without using the standards and supporting-timbers.

By these means we have produced an apparatus which, when in position for use, provides a firm support for machinery to be used in subaqueous operations, and for the men employed in working said machinery; furthermore, the operation of adjusting our frame in working position, and of removing it, is materially facilitated, and an apparatus is obtained which is cheap and durable in its construction, and very economical in its operation, since no heavy weight is to be lifted or sustained, and no greater power is required than that provided for the working of the legs or struts.

What we claim as new, and desire to secure by Letters Patent, is—

1. The combination, with a frame or staging provided with sliding legs or struts, and intended to support the mechanism to be employed in a subaqueous operation, of an independent float or scow, adapted to support said frame when the legs or struts are raised, substantially as shown and described.

2. The combination, with a frame or staging, with the sliding legs or struts fitted to said frame, and with a float or scow intended for the support of said staging, of suitable standards fastened to the scow and supporting-timbers, adapted to slide up and down on said standards and to bear under traverses of the frame or staging, substantially as set forth.

3. The combination, with a frame or staging, with the sliding legs or struts fitted to said frame, and with a float or scow, of standards fastened to said scow, and adapted to be raised or lowered at will, and of supporting-timbers adapted to be adjusted on said standards, to facilitate the operation of floating the scow, with its standards and supporting-timbers, under the frame or staging, substantially as described.

4. The combination, with the frame or staging A, and with its sliding legs or struts B, of windlasses C C, each connecting by ropes or chains with the opposite ends of one of the legs or struts, substantially as and for the purpose set forth.

5. The combination, with the frame or staging A, of legs or struts B, placed in an inclined or flaring position, and adapted to slide in suitable guides attached to the frame or staging, and be held in the desired adjusted position by friction between the sliding parts, substantially as and for the purpose shown and described.

In testimony that we claim the foregoing we have hereunto set our hands and seals this 15th day of February, 1878.

JULIUS H. STRIEDINGER. [L. S.]
JAMES R. F. KELLY. [L. S.]
KELLES KORROW. [L. S.]

Witnesses:
W. HAUFF,
E. F. KASTENHUBER.